US007629711B2

(12) United States Patent
Zhong et al.

(10) Patent No.: US 7,629,711 B2
(45) Date of Patent: Dec. 8, 2009

(54) LOAD INDEPENDENT VOLTAGE REGULATOR

(75) Inventors: Kai Zhong, Lake Worth, FL (US); John J. Parkes, Jr., Boynton Beach, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 252 days.

(21) Appl. No.: 11/690,596

(22) Filed: Mar. 23, 2007

(65) Prior Publication Data

US 2008/0231243 A1 Sep. 25, 2008

(51) Int. Cl.
*H02J 1/00* (2006.01)
*G05F 1/569* (2006.01)

(52) U.S. Cl. ....................... 307/103; 323/276; 323/277; 323/278; 323/279

(58) Field of Classification Search ................. 307/103; 323/273, 274, 275, 276, 277, 278, 279, 280, 323/281
See application file for complete search history.

(56) References Cited

U.S. PATENT DOCUMENTS 5,548,205 A * 8/1996 Monticelli .................. 323/274
6,812,592 B2 * 11/2004 Iwata et al. ................. 307/103
7,112,898 B2 * 9/2006 Brown et al. ................ 307/103
7,208,924 B2 * 4/2007 Toyoshima et al. ......... 323/271
7,208,999 B2 * 4/2007 Saitoh ........................ 327/541
7,362,080 B2 * 4/2008 Sohn et al. .................. 323/277
7,400,126 B2 * 7/2008 Iwashita ..................... 323/286
7,443,149 B2 * 10/2008 Nishimura et al. .......... 323/280

OTHER PUBLICATIONS

"Microchip PIC12C67X and PIC12CE67X—In-Circuit Serial Programming for PIC12C67X and PIC12CE67X OTP MCUs", Microchip Technology Inc., 2001.*

* cited by examiner

*Primary Examiner*—Albert W Paladini
*Assistant Examiner*—Hal I Kaplan

(57) ABSTRACT

An integrated circuit package (202) includes a voltage regulator (208) and a power-out pin (236) for coupling to a load circuit (210) via a connection (234) external to the integrated circuit package and for coupling to an output (230) of the voltage regulator via a connection (224, 228, 226 and 231) internal to the integrated circuit package. The internal connection has a series resistance that causes a voltage drop due to a load current. The voltage regulator compensates for the voltage drop in the internal connection using a current feedback circuit, in which the current fed back is proportional to the voltage drop caused by the series resistance of the internal connection.

20 Claims, 5 Drawing Sheets

100

-PRIOR ART-

400

LOAD INDEPENDENT VOLTAGE REGULATOR

BACKGROUND OF THE INVENTION

1. Field of the Invention

This invention relates generally to voltage regulators, and more specifically to voltage regulators in an integrated circuit.

2. Related Art

A low-dropout regulator is implemented in circuit applications to provide a regulated power supply. A low-dropout regulator is a DC linear voltage regulator that has a very small input-to-output differential voltage.

FIG. 1 is a known circuit 100 that illustrates the manner in which a known low-dropout voltage regulator 108 is used. The circuit 100 includes an integrated circuit (IC) 101 within an IC package 102. The known regulator 108 is one of a plurality of circuits on the IC 101. The IC package 102 has a plurality of pins 103 for connecting the IC 101 to circuits external to the IC package 102. A battery 120 supplies power to the regulator 108 via a power pin 122. An output 130 from the regulator 108 is also coupled to power-out pin 132 via a metal run 124 on the IC, and a wire bond 126 between a bond pad 128 at an end of the metal run on the IC and an internal portion 131 of the power-out pin 132. An external capacitor 140 is coupled between the power-out pin 132 and ground. The known circuit 100 includes an external metal run 134 between an external portion 136 of the power-out pin 132 and a load pin 142. The IC 101 includes a load circuit 110 coupled to the load pin 142. The regulator 108 provides a regulated voltage to the load circuit 110.

One of the important aspects of any voltage regulator is load regulation. Unless compensated for, the output voltage of a voltage regulator decreases as the output current increases. The output voltage from a voltage regulator varies as a function of the output, or load, current because of a presence of a plurality of resistances in the coupling between the regulator and its load.

There is a voltage drop between the output 130 of the known regulator 108 and node 138 that is caused by a total resistance between the output 130 of the regulator 108 and node 138. The total resistance includes the resistance due to the metal run 124 on the IC 101 between the output 130 of the regulator 108 and a bond pad 128 at an end of the metal run, the resistance due to the connection with the wire bond 126 at the bond pad, the resistance of the wire bond, and the resistance of the power-out pin 132 and connections thereat. The known regulator 108 requires that the voltage drop at node 138 due to the total resistance be compensated for. A typical known regulator 108 determines the total resistance by measuring the voltage at node 138. Then, the typical regulator 108 places the amount of the voltage drop (between the output 130 and node 138) into a feedback loop (not shown) within the known regulator so that the desired regulated voltage appears at node 138. The known regulator 108 senses the voltage at node 138 via a sense pin 182 on the IC package 102. Therefore, the known regulator 108 disadvantageously requires the sense pin 182 in addition to the power-out pin 132.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE EXEMPLARY EMBODIMENT

Figure 1:
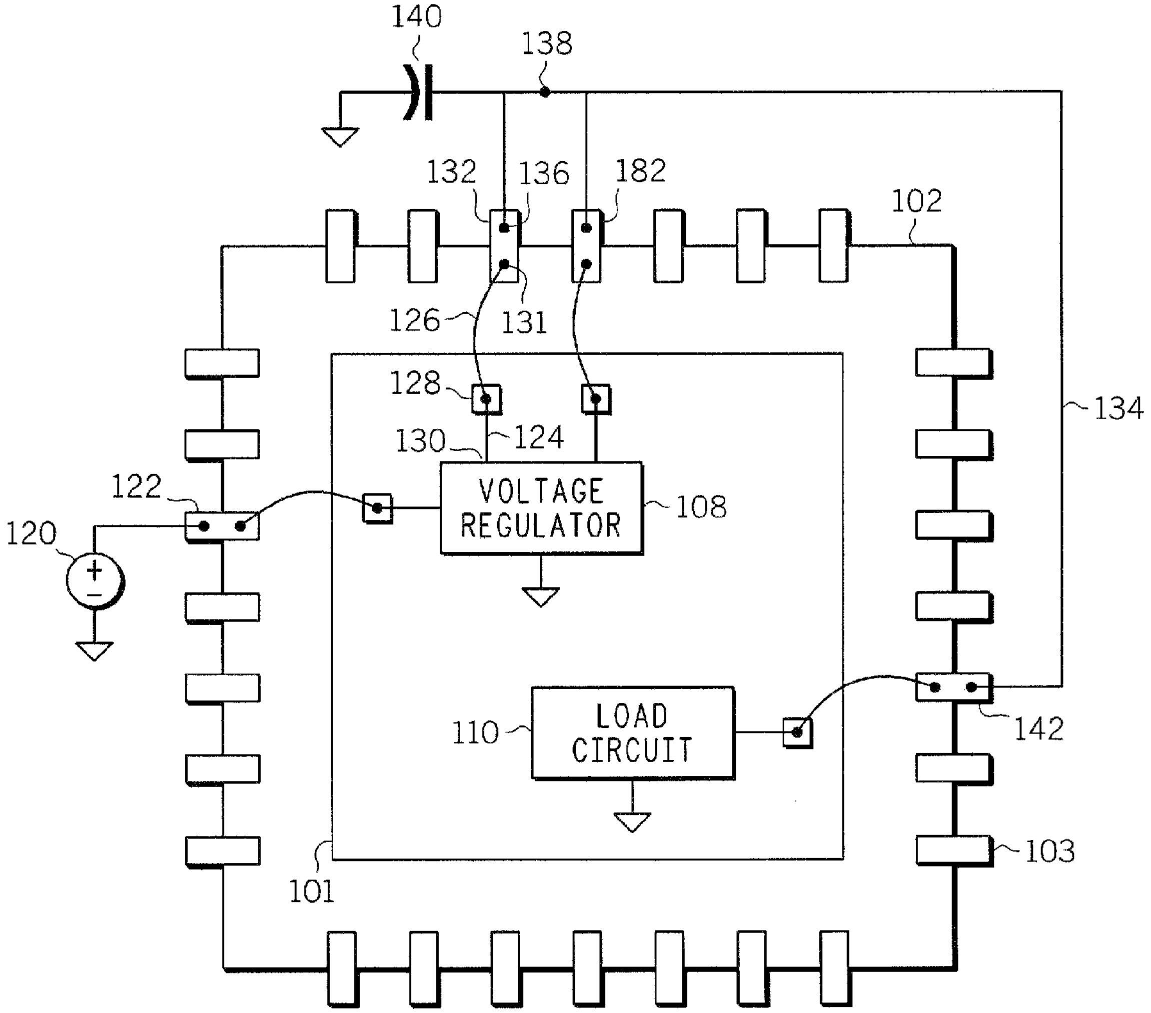
FIG. 1 is a simplified diagram of a prior art circuit including a prior art integrated circuit package including a prior art voltage regulator, and a battery and a capacitor external to the prior art integrated circuit package.
Figure 2:
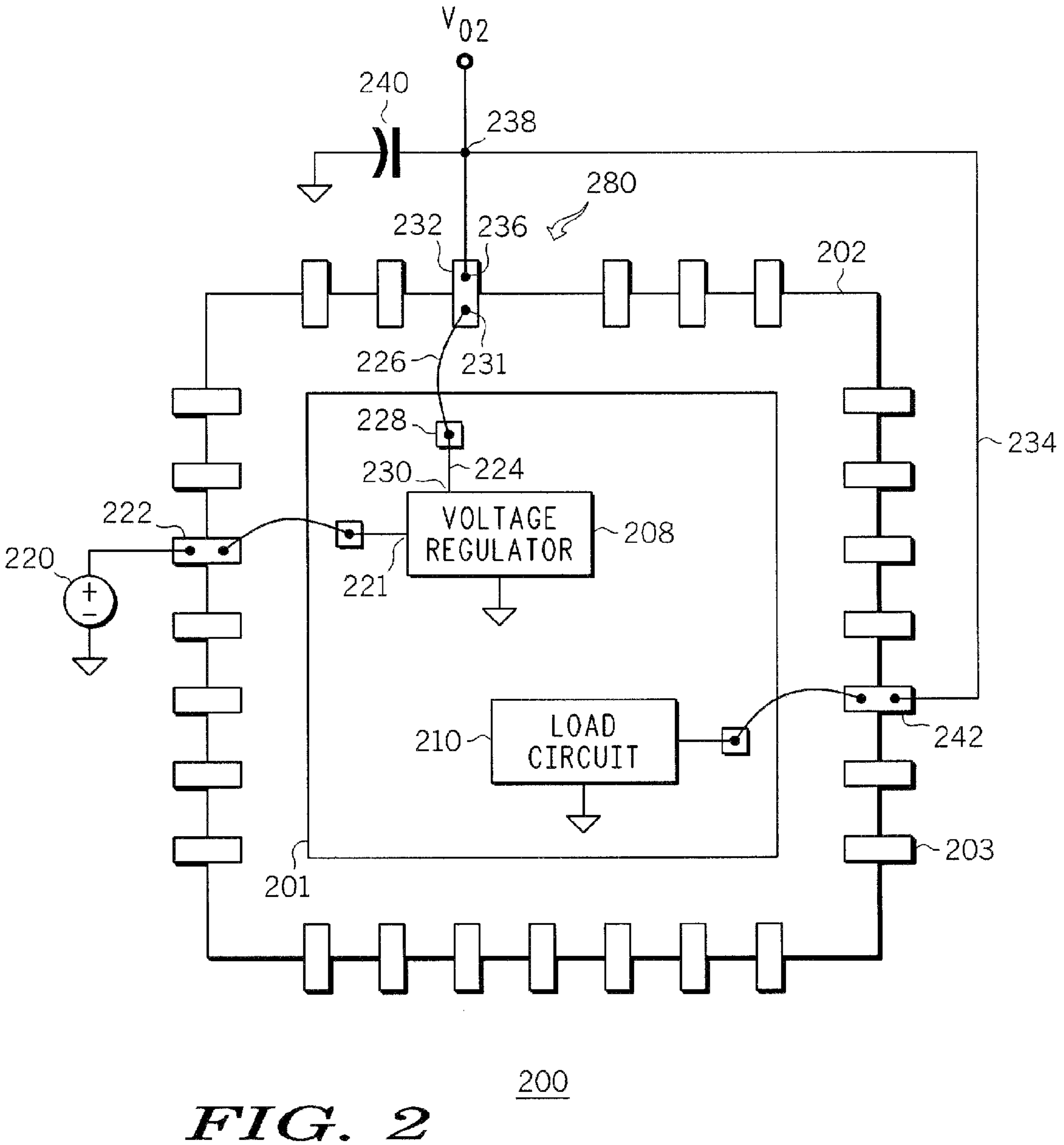
FIG. 2 is a simplified diagram of a circuit including an integrated circuit package including a load independent voltage regulator, and a battery and a capacitor external to the integrated circuit package.

FIG. 2 is a simplified diagram of a circuit 200 that illustrates the manner in which a load independent voltage regulator (hereinafter "regulator") 208 is used. The circuit 200 includes an integrated circuit (IC) 201 within an IC package 202. The regulator 208 is one of a plurality of circuits on the IC 201. The IC package 202 has a plurality of pins 203 for connecting the IC 201 to circuits external to the IC package 202. A battery 220 supplies power to an input 221 of the regulator 208 via a power-in pin 222. In the exemplary embodiment, the voltage of the battery, $V_{BATTERY}$, is 1.7 v to 3.3 v. An output 230 from the regulator 208 is coupled to a power-out pin 232 via a metal run 224 that terminates at a bond pad 228 on the IC, and via a wire bond 226 between the bond pad 228 and an internal portion 231 of the power-out pin 232. An external capacitor 240 is coupled between the power-out pin 232 and ground. The circuit 200 includes an external metal run 234 between an external portion 236 of the power-out pin 232 and a load pin 242. In the exemplary embodiment, the external metal run 234 is part of a printed circuit board (not shown). The IC 201 includes a load circuit 210 coupled to the load pin 242. The load circuit 210 is coupled to a capacitor 240. Capacitor 240 is typically greater than 1000 pF to help filter ripple and noise, and, because of its large size, it is located external to the IC 201. The regulator 208 provides a regulated voltage to the load circuit 210. In an alternative embodiment (not shown), the load circuit 210 is external to the IC package 202.

Figure 3:
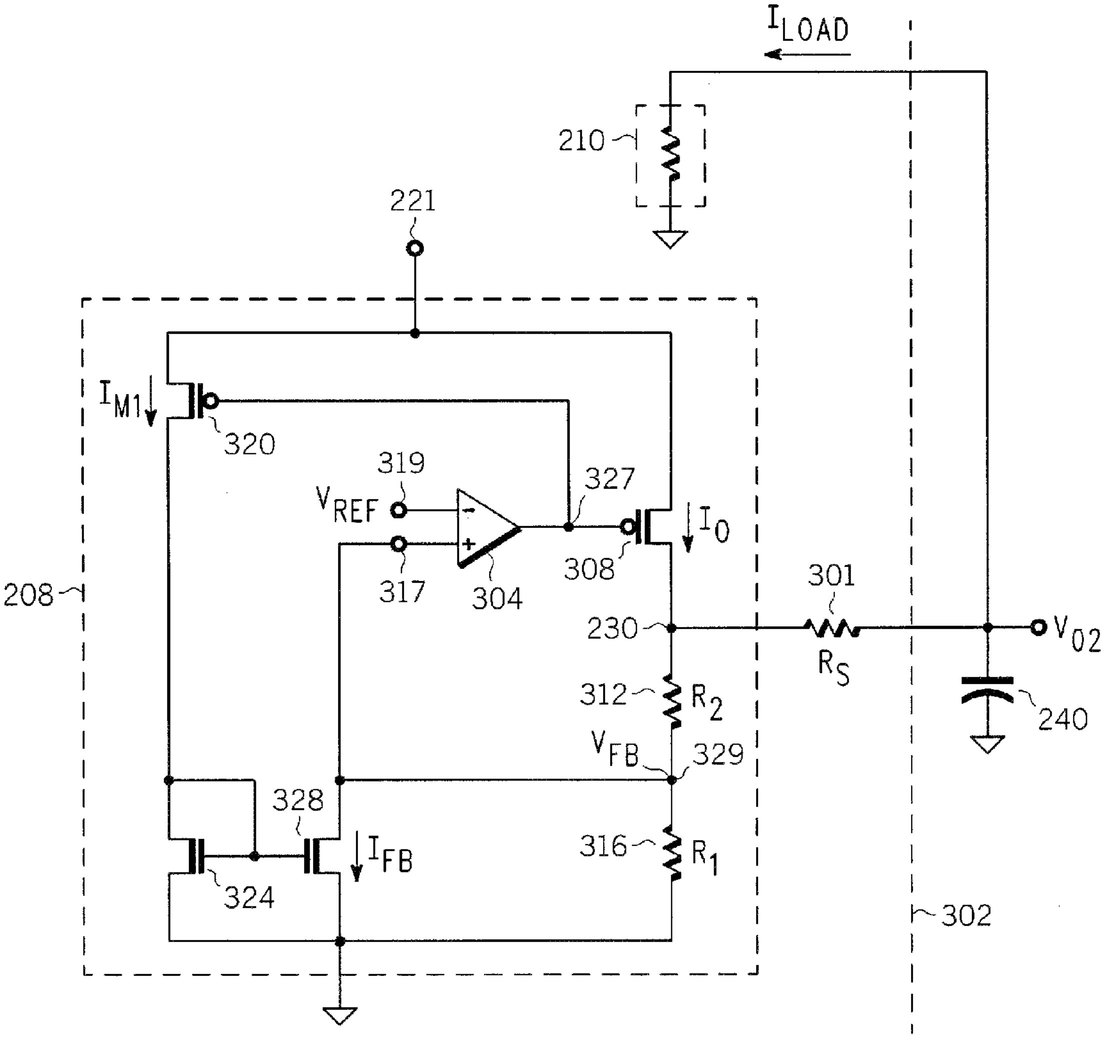
FIG. 3 is a schematic of a portion of the circuit of FIG. 2 including a detailed schematic of the load independent voltage regulator.

There is a voltage drop between the output 230 of the regulator 208 and node 238 that is caused by a resistance, $R_S$ 301 (see FIG. 3). $R_S$ 301 represents a total of several resistances between the output 230 of the regulator 208 and node 238. $R_S$ 301 includes the resistance due to the metal run 224 on the IC 201 between the output 230 of the regulator 208 and the bond pad 228, the resistance due to a connection with the wire bond 226 at the bond pad, the resistance of the wire bond, and the resistance of the power-out pin 232 and connections thereat. The value of the $R_S$ is dependent on technology, process, layout and packaging. Typical values for the resistances that are included in $R_S$ 301 are as follows. The resistance due to the metal run 224 on the IC 201 between the output 230 of the regulator 208 and the bond pad 228 is approximately 0.4 ohm. The resistance due to a connection with the wire bond 226 at the bond pad 228 is approximately 0.05 ohm. The resistance of the wire bond is approximately 0.1 ohm. The resistance of the power-out pin 232 is approximately 0.25 ohm. Therefore, a typical value for $R_S$ is approximately 0.8 ohm.

Referring now to FIG. 3, which is a schematic of a portion of the circuit 100, including a detailed schematic of the regulator 208, the portion of the circuit that is within the IC package 202 is shown on the left side of dotted line 302, and the portion of the circuit external to the IC package is shown to the right of the dotted line. The regulator 208 can be considered to be partitioned into three main sections: a power transistor, or drive device, 308; a high gain differential amplifier, or error amplifier, 304; and a resistor voltage feedback network comprising resistor $R_1$ 316 and resistor $R_2$ 312, as shown FIG. 3. A first input 317 of the differential amplifier 304 monitors a percentage of the voltage at the output 230, as determined by a ratio of resistor $R_1$ 316 to resistor $R_2$ 312. A second input 319 of the differential amplifier 304 is from a stable voltage reference. The voltage at the output 230 is divided by the resistor ladder $R_1$ and $R_2$, and compared with the reference voltage $V_{REF}$. If the voltage at the output 230 rises too high relative to the reference voltage, the driving voltage at the gate of transistor 308 changes to maintain a constant voltage at the output. The drive device 308 is used as a current source that is controlled by the output of the differential amplifier 304. The current in the drive device 308 is controlled according to this difference. Assuming $R_S$ and $I_{FB}$ are equal to zero, the voltage at the output 230 is given by $$V_{O2}=V_{REF}*(1+R_2/R_1)$$

Load regulation is the ability of the voltage regulator to regulate a specified output voltage under varying load currents, as described by the equation $$\text{Load regulation}=\Delta V_O/\Delta I_O=(1/(gmp*A))*(R_2/R_1+1),$$

where a series resistance, $R_S$, of the output of the regulator is assumed to be zero, gmp is the DC transconductance of the drive device 308, and A is the DC gain, i.e., the open loop gain, of the error amplifier 304. The higher the open loop gain is, the lower the load regulation becomes. But as the open loop gain increases, the system stability is jeopardized. Therefore, the load regulation is limited by some finite amount of open loop gain at DC. However, in an actual circuit, such as the circuit shown in FIG. 3, the series resistance $R_S$ is not zero, and a non-zero value for $R_S$ degrades the load regulation further.

The exemplary embodiment of the voltage regulator 208 has a gain of two and an input reference voltage of 1.2 v; therefore, the voltage at the output 230 is regulated to 2.4 v. Resistance $R_S$ 301 in series with the load current forms an IR drop between the output 230 of the voltage regulator 208 and the external portion 236 of the power-out pin 232. The output is taken at node $V_{O2}$, which is preceded by a series resistance, $R_S$. When $R_S$ and $I_{FB}$ are considered, the equation for $V_{O2}$ becomes:

$$V_{O2}=V_{REF}*(R_2/R_1+1)-(I_{LOAD}*R_S)+(I_{FB}*R_2).$$

$$\text{Setting } (I_{FB}*R_2)-(I_{LOAD}*R_S)=0,\text{ yields } I_{FB}=(R_S/R_2)*I_{LOAD}.$$

The correction current, or feedback current, $I_{FB}$, is the ratio ($R_S/R_2$) multiplied by the load current, $I_{LOAD}$.

The voltage regulator 208 includes a current feedback circuit. The operation of the current feedback circuit is as follows: The gate area size ratio of transistor 308 to transistor 320 is defined as N. The current in transistor 308 is mirrored in transistor 320 and divided by N. The current in transistor 320 has a magnitude defined as $I_O$/N. In other words, $I_{M1}$ is equal to $I_O$/N. Transistor 324 and transistor 328 are configured as a current mirror and transform the input current, $I_{M1}$, from a source to a sink. Current $I_{FB}$ is also equal to $I_O$/N, assuming the sizes of transistor 324 and transistor 328 are identical and no scaling takes place. When $I_O$ increases due to the load current, $I_{LOAD}$ increasing, the current in transistor 328, $I_{FB}$, grows in magnitude as well. The increase in $I_{FB}$ causes the voltage at node 230 to become higher because the closed loop dynamics of the voltage feedback force $V_{FB}$ to approximate $V_{REF}$. The voltage at node 327, i.e., the gate of drive device 308, decreases because transistor 308 has to supply the $I_{FB}$ current. This, in turn, increases the voltage at the output 230 of the regulator 208, which also increases, $V_{O2}$, the voltage at the load 210. The feedback current, $I_{FB}=I_O/N$, is proportional to the load current, and that relationship tends to minimize variations in the voltage at the load $V_{O2}$, and compensates for the negative impact of the IR drop due to $R_s$. As the load current increases, the feedback current, $I_{FB}$, increases as well. This increase applies more corrective action, thus maintaining a constant voltage at the load $V_{O2}$. Thus, the voltage regulator 208 includes an autonomous circuit that feeds back a correction signal, $I_{FB}$, proportional to the amount of output IR drop, to maintain the voltage level of the voltage regulator 208 constant as a function of load current.

The value of N is chosen based on the ratio of $R_S/R_2$. The relative size ratio of transistor 308 to transistor 320 is N, therefore, the current $I_{M1}$ is $I_O$/N. Transistor 324 and transistor 328 mirror current $I_O$/N around and sink it out of the tap point 329 of the resistor network. Current $I_O$ and the correction current, $I_O$/N, change directly with the load current $I_{LOAD}$. For example, when the current $I_{LOAD}$ increases, so do the current $I_O$ and $I_O$/N. This increase in current causes the voltage at node 230 to go higher because the negative voltage feedback forces $V_{FB}$ 329 to approximate $V_{REF}$ 319. The voltage at node 327 decreases because transistor 308 has to supply the extra $I_O$/N current; this, in turn, increases the voltage at node 230, which, in turn, keeps the voltage at the load, $V_{O2}$, constant.

Figure 4:
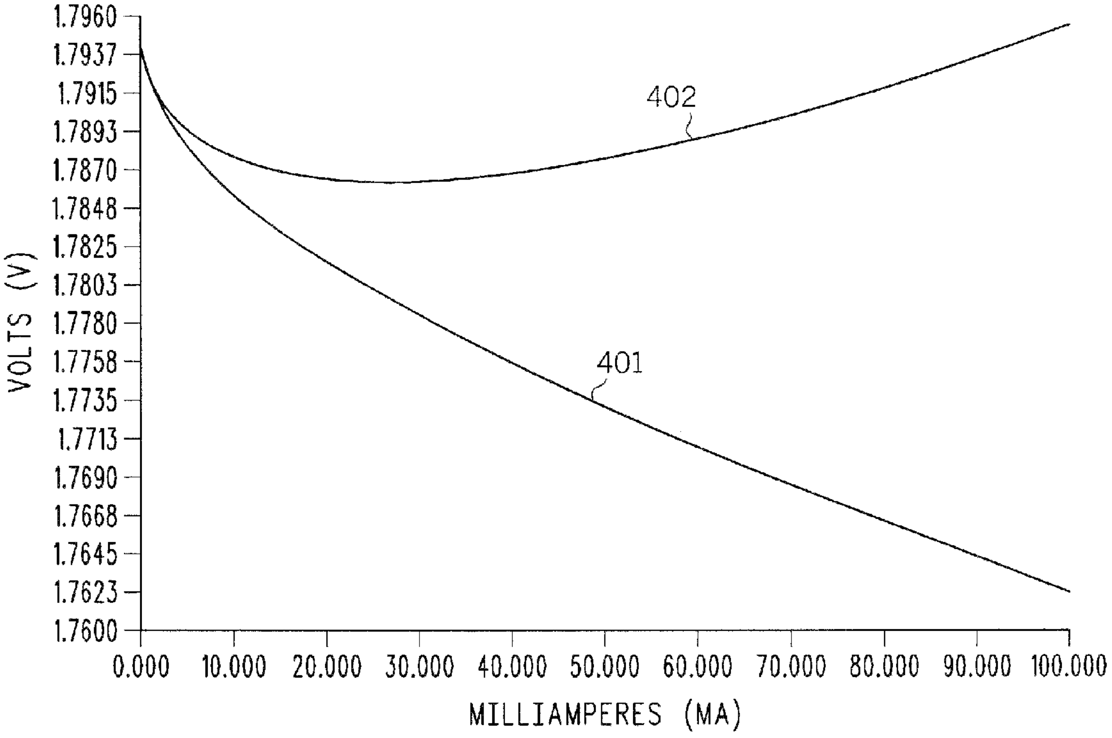
FIG. 4 is a graph of output voltage versus load current for the load independent voltage regulator of FIG. 2.

FIG. 4 is a graph of the voltage $V_{O2}$ at the external portion 236 of the power-out pin 232 versus load current for the voltage regulator 208. Curve 402 of FIG. 4 represents the response of the circuit 200 with the exemplary embodiment of the voltage regulator 208. Curve 401 of FIG. 4 represents an experimental response of the circuit 208, but with the current feedback circuit of the voltage regulator 208 defeated, $I_{FB}$=0. FIG. 4 shows that the output voltage variation is significantly reduced when the current feedback circuit is active, $I_{FB}$>0, (curve 402) compared to when the current feedback circuit is defeated, $I_{FB}$=0, (curve 401). A graph of output voltage versus load current for the prior art voltage regulator 108 would be similar to curve 401. Curve 401 illustrates the detrimental impact that $R_S$ has on the prior art circuit 100.

The output from the IC package 202 is taken at node $V_{O2}$ (power-out pin 232), which is preceded by a series resistance, $R_S$. In the equation for $V_{O2}$:

$$V_{O2}=V_{REF}*(R_2/R_1+1)-(I_{LOAD}*R_S)+(I_{FB}*R_2)$$

the feedback current is defined as IFB, the load current is defined as $I_{FB}$, the load current is defined as $I_{LOAD}$, and the voltage gain setting resistors are $R_2$ and $R_1$. To cancel out the affects of $R_S$, the equation, ($I_{FB}$*$R_2$)−($I_{LOAD}$*$R_S$)=0, needs to be valid so $V_{O2}$ is only dependent on the voltage gain setting resistors and the input reference voltage. The preceding equation yields the ratio ($I_{FB}/I_{LOAD}$)=($R_S/R_2$), which was previously defined as N. Therefore, based on the $R_S$ and $R_2$ values, a current can be determined and fed back to counteract the ill effects of $R_S$ 301 on the voltage at the power-out pin 232. In the exemplary embodiment of the voltage regulator 208, the following components have the following values:

$R_S$=1

Resistor $R_2$312=100 Kohm, therefore, $N=R_S/R_2=0.00001$

Resistor $R_1$316=100 Kohm $V_{REF}$=1.2 v $V_{O2}$=2.4 v

The exemplary embodiment of the feedback circuit uses current mirrors, transistors 308 and transistor 320, with a ratio of N to set the feedback current. An alternative embodiment of the feedback circuit uses current mirrors, transistors 324 and transistor 328, with a ratio of M to set the feedback current. A further alternative embodiment of the feedback circuit uses two sets of current mirrors, transistors 308 and transistor 320, with a ratio of N, and current mirrors, transistors 324 and transistor 328, with a ratio of M to set the feedback current, thereby allowing non-integer ratios. The current through the voltage gain setting feedback resistors 312 and 316 are ignored and has little effect on the outcome. With the current feedback circuit defeated $V_{O2}$ has a magnitude inversely proportional to the load current. With the current feedback circuit active, $V_{O2}$ effectively remains unchanged, thus achieving voltage regulation. The feedback circuit of the voltage regulator 208 improves load regulation when a resistive path $R_S$ 301 is in series with the load 210. The feedback circuit reduces the dependence of output voltage on load current.

The regulator 208 advantageously does not require that the voltage drop at node 238 be placed into a feedback loop of the regulator 208. Therefore, the regulator 208 advantageously does not need the prior art sense pin 182 that is present in known regulators. The elimination of the sense pin 182 contributes to a reduction of size of the IC package 202. Arrow 280 points to an area of an absent sense pin.

Figure 5:
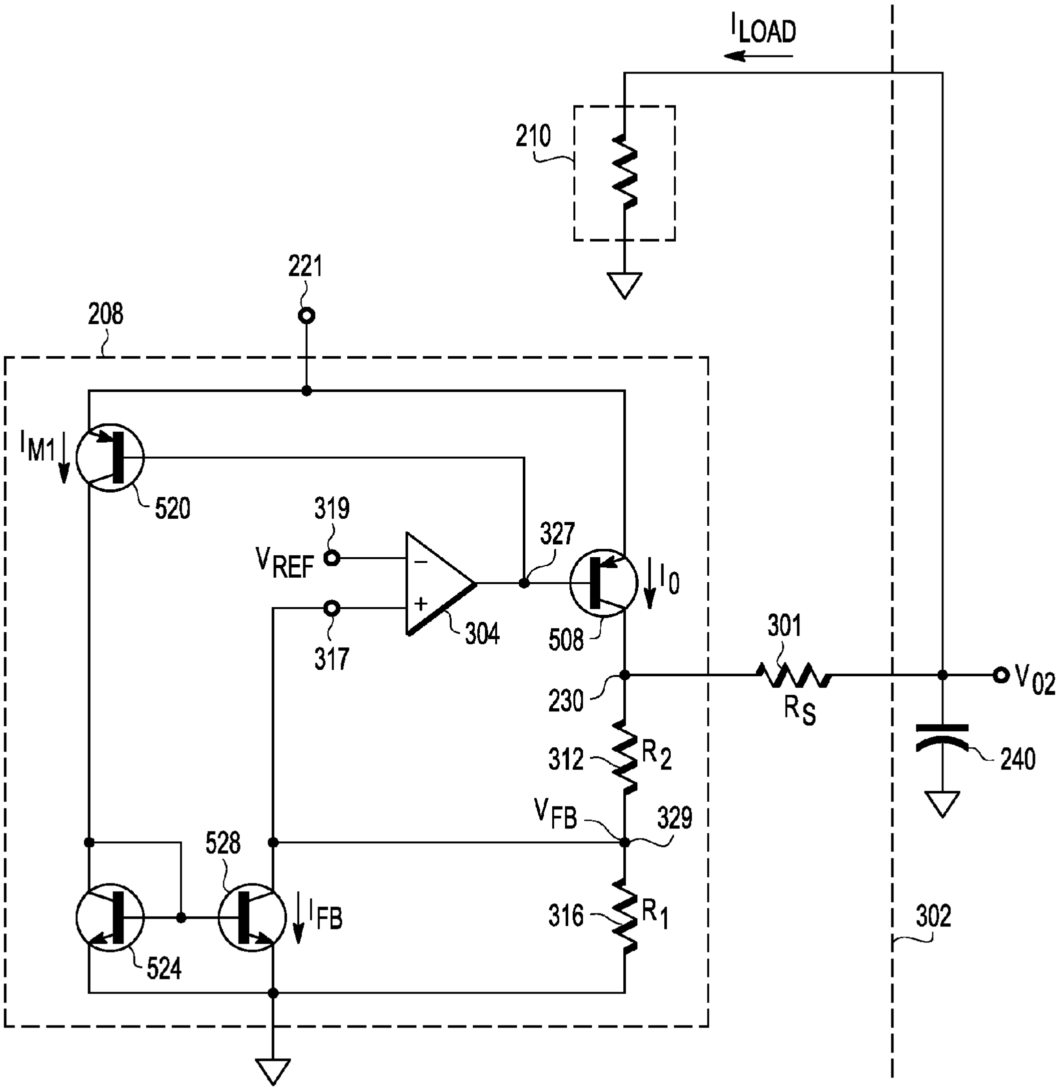
FIG. 5 is a schematic of a portion of the circuit of FIG. 2 including a detailed schematic an alternative embodiment of the load independent voltage regulator.

In the exemplary embodiment, the IC 201 is fabricated by a complementary metal oxide semiconductor (CMOS) process. In an alternative embodiment, the IC 201 is fabricated using a multiple-oxide complementary metal oxide semiconductor (CMOS) process. In the alternative embodiment, the IC 201 comprises at least one thin oxide area and at least one thick oxide area. In the alternative embodiment, the regulator 208 is located in a thick oxide area, and the load circuit 210 is located in a thin oxide area. In a further alternative embodiment, the IC 201 uses bipolar transistors 508, 520, 524 and 528, as shown in FIG. 5.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as “first” and “second” are used to arbitrarily distinguish between the elements such terms describe. Thus, these terms are not necessarily intended to indicate temporal or other prioritization of such elements.

What is claimed is:

1. An integrated circuit package, comprising:

an integrated circuit, the integrated circuit including a voltage regulator, the voltage regulator having an output for providing a regulated voltage;

a power-out pin having an external portion for coupling to a load circuit via a connection external to the integrated circuit package and having an internal portion for coupling to the output of the voltage regulator; and means for coupling the power-out pin to the output of the voltage regulator, the means for coupling having a series resistance;

wherein the voltage regulator includes means for compensating for a voltage drop caused by the means for coupling, the means for compensating comprising a current feedback circuit wherein a current that is fed back is proportional to the voltage drop caused by the means for coupling.

2. The integrated circuit package of claim 1, in which the integrated circuit is fabricated using a complementary metal oxide semiconductor (CMOS) process.

3. The integrated circuit package of claim 1, in which the integrated circuit is fabricated using bipolar transistors.

4. The integrated circuit package of claim 1, in which the means for coupling includes a metal run on the integrated circuit between the output of the voltage regulator and a bond pad on the integrated circuit, and a wire bond between the bond pad and the internal portion of the power-out pin.

5. The integrated circuit package of claim 1 in which the voltage regulator includes a power transistor having a gate, a drain coupled to an output of the voltage regulator, and a source coupled to a power supply for supplying an input current to the voltage regulator, a differential amplifier having an output coupled to the gate of the power transistor and an input coupled to a voltage reference, a second transistor having a current that mirrors a predetermined fraction of the input current, and a resistor network coupled to the output of the voltage regulator and to ground, the resistor network having a tap, the tap coupled to another input of the differential amplifier and to a drain of the second transistor.

6. A voltage regulator, comprising:

a power transistor having a gate, a drain coupled to an output of the voltage regulator, and a source coupled to a power supply for supplying an input current to the voltage regulator;

a differential amplifier having an output coupled to the gate of the power transistor and an input coupled to a voltage reference;

means for coupling the output of the voltage regulator to a load circuit, the means for coupling having a series resistance;

a second transistor having a current that mirrors a predetermined fraction of the input current; and a resistor network coupled to the output of the voltage regulator and to ground, the resistor network having a tap, the tap coupled to another input of the differential amplifier and to a drain of the second transistor, wherein a feedback current from the tap of the resistor network to the drain of the second transistor is proportional to a voltage drop across the means for coupling, and wherein a voltage at the tap of the resistor network remains unchanged in spite of changes in the feedback current.

7. The voltage regulator of claim 6, including a third transistor connected in a current mirror configuration with the power transistor, the third transistor having a drain coupled to a gate of the second transistor, wherein the predetermined fraction is set by a first ratio between a gate area of the third transistor to a gate area of the power transistor.

8. The voltage regulator of claim 6, including a fourth transistor connected in a current mirror configuration with the second transistor, wherein the predetermined fraction is set by a second ratio between a gate area of the fourth transistor to a gate area of the second transistor.

9. The voltage regulator of claim 6, including a third transistor connected in a current mirror configuration with the power transistor, the third transistor having a drain coupled to a gate of the second transistor, and a fourth transistor connected in a current mirror configuration with the second transistor, wherein the predetermined fraction is set by a combination of a first ratio between a gate area of the third transistor to a gate area of the power transistor, and a second ratio between a gate area of the fourth transistor to a gate area of the second transistor.

10. The voltage regulator of claim 6, implemented in an integrated circuit fabricated using a multiple-oxide complementary metal oxide semiconductor (CMOS) process.

11. The voltage regulator of claim 10 in which the load circuit is located external to the integrated circuit.

12. The voltage regulator of claim 10 in which the load circuit is in the integrated circuit.

13. The voltage regulator of claim 10, in which the integrated circuit comprises at least one thin oxide area and at least one thick oxide area.

14. The voltage regulator of claim 13 in which the voltage regulator is located in a thick oxide area.

15. The voltage regulator of claim 13 in which the load circuit is located in a thin oxide area.

16. An integrated circuit package, comprising:

an integrated circuit;

a voltage regulator having a regulated voltage signal output;

a resistance within the integrated circuit package, the resistance having an input and an output, the regulated voltage signal output being at a same electrical node as the input of the resistance; and a load circuit having an input and an output, the output of the load circuit being electrically coupled to ground and the input of the load circuit being electrically coupled to the output of the resistance, wherein the voltage regulator includes a resistor ladder network coupled to ground and to the same electrical node as the input of the resistance, the resistor ladder network comprising a first resistor and a second resistor and producing a feedback voltage determined by a ratio of a resistance of the first resistor to a resistance of the second resistor, the feedback voltage being proportional to the voltage at the input of the resistance, and wherein the voltage regulator includes means for compensating for a voltage drop caused by the resistance, the means for compensating comprising a current feedback circuit wherein a current that is fed back is proportional to the voltage drop caused by the resistance.

17. The integrated circuit package of claim 16, in which the load circuit is external to the integrated circuit package.

18. The integrated circuit package of claim 16, in which the load circuit is within the integrated circuit package.

19. The integrated circuit package of claim 16, in which the integrated circuit is fabricated using a complementary metal oxide semiconductor (CMOS) process.

20. The integrated circuit package of claim 16, in which the integrated circuit uses bipolar transistors.

* * * * *